United States Patent [19]

Downing et al.

[11] 4,144,385

[45] Mar. 13, 1979

[54] INTUMESCENT COATING MATERIALS

[75] Inventors: Brian Y. Downing, Kingswinford; George D. Hamer, Birmingham, both of England

[73] Assignee: British Industrial Plastics Limited, Manchester, England

[21] Appl. No.: 851,380

[22] Filed: Nov. 14, 1977

[30] Foreign Application Priority Data

Nov. 27, 1976 [GB] United Kingdom ............ 49567/76

[51] Int. Cl.$^2$ ............................ C08J 9/00; C08J 9/10
[52] U.S. Cl. ........................................ 521/95; 428/921; 521/84; 521/85; 521/88; 521/106; 521/109; 521/117; 521/128; 521/138; 521/907
[58] Field of Search ................ 260/2.5 FP, DIG. 24; 521/907, 95

[56] References Cited

U.S. PATENT DOCUMENTS

| | | | |
|---|---|---|---|
| 2,596,938 | 5/1952 | Nielsen et al. | 260/DIG. 24 |
| 3,037,951 | 6/1962 | Basto et al. | 260/2.5 FP |
| 3,654,190 | 4/1972 | Levine | 260/2.5 FP |
| 3,955,987 | 5/1976 | Schoor et al. | 260/DIG. 24 |
| 4,026,810 | 5/1977 | Bost | 260/2.5 FP |
| 4,035,315 | 7/1977 | Ingram | 260/2.5 FP |
| 4,043,950 | 8/1977 | Wilmsen | 260/2.5 FP |

Primary Examiner—Morton Foelak
Attorney, Agent, or Firm—Stevens, Davis, Miller & Mosher

[57] ABSTRACT

An intumescent composition comprising a resinous binder, an inorganic acid source, a carbon source and a blowing agent, the blowing agent comprises
(a) a 2-amino s-triazine of general formula

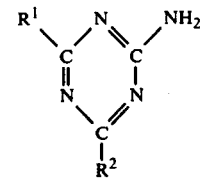

in which $R^1$ and $R^2$ are the same of different and are each selected from hydrogen, halogen, hydroxyl and amino groups and alkyl, substituted alkyl, alkenyl and substituted alkenyl groups containing up to 6 carbon atoms and
(b) a saturated or unsaturated polybasic carboxylic acid containing no more than 2 non-carboxyl carbon atoms per carboxyl group.

20 Claims, No Drawings

INTUMESCENT COATING MATERIALS

This invention relates to intumescent compositions. Such compositions are usually used to form coatings which, when heated, swell up and form a stable foam barrier to afford a degree of insulation for the substrate underneath. They conventionally contain a polymeric binder, usually thermoplastic, and additives which give rise to the intumescent properties.

The latter are conventionally an inorganic acid source material, usually a phosphate, a carbonaceous material, usually polyhydric, and a blowing agent such as melamine, such that when heated the carbonaceous material chars to carbon and is puffed into a foam by the blowing agent. According to the present invention an intumescent composition comprises a resinous binder and an inorganic acid source, a carbon source and as blowing agent a salt of a 2 -amino s-triazine of general formula

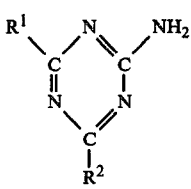

in which $R^1$ and $R^2$ may be the same or different and are each selected from hydrogen, halogen, hydroxyl and amino groups and alkyl, substituted alkyl, alkenyl and substituted alkenyl groups containing up to 6 carbon atoms with a saturated or unsaturated polybasic carboxylic acid containing no more than 2 non-carboxyl carbon atoms per carboxyl group.

The inorganic acid source, carbon source and blowing agent can be selected from a range of materials as indicated below. In order that the composition's intumescent properties are retained in damp conditions it is preferred that the materials used have low water solubilities to resist their being leached out of the composition. On the other hand if a composition is for use in low humidities only then this requirement is much reduced.

The inorganic acid source will generally be an inorganic material yielding a mineral acid such as sulphuric or phosphoric at a temperature between 200° C. and 250° C. A preferred example is ammonium polyphosphate.

The carbon source material is an organic compound containing hydroxyl groups which will react with the acid, and a high proportion of carbon so that when charred during heating a useful amount of carbon is produced. Examples of such materials are starches, polyhydric alcohols such as erythritol, pentaerythritol, di- and tri-pentaerythritol, and sugars such as glucose, maltose. The preferred material is dipentaerythritol.

The blowing agent is required to release non-flammable gases at the temperature where the coating has begun to melt and char so that a foam can be formed from the charring mass.

We have found that the 2-amino s-triazine salts defined above will enhance the intumescent properties of the composition, and also its fire resistance. The most preferred salts have been found to be melamine monooxalate, and dimelamine oxalate.

On the other hand some advantages in intumescent properties and/or fire resistance are to be gained over compositions omitting these salts when using such salts as acetoguanamine oxalate, propioguanamine oxalate, melamine succinate, and melamine maleate.

In the compositions the ratio of resin binder to total intumescent additives is preferably in the range (by weight) of 75:25 to 40:60.

Similarly, amongst the intumescent additives the ratio (by weight) of phosphate to total carbon source + blowing agent is preferably in the range 85:15 to 30:70, and the ratio of polyhydric compound to blowing agent (by weight) is preferably in the range 90:10 to 10:90.

In composition the resin binder may be in the form of an unsaturated polyester resin solution in monomer, the composition also including catalyst and cure promoter for the resin, intumescent additives and optionally other additives such as pigment.

The unsaturated polyester is typically utilized in the composition in the form of a solution of the polymer in a monomer such as styrene, the amount of monomer preferably being in the range 20 to 60 wt %.

By unsaturated polyester we mean a polyester of the kind which contains carbon-carbon unsaturation along its backbone chain.

The unsaturated polyester is preferably plasticized to enhance its capability as binder in the intumescent system.

As plasticizer an unsaturated polyester resin may be used, this also being a solution in styrene monomer, of similar styrene content to the other polyester. Plasticizing resins suitable for use in this composition are characterized by containing units derived from long chain dibasic aliphatic acids such as adipic, azelaic, sebacic and linoleic acids, or long chain polyols such as diethylene glycol, triethylene glycol, 1,6 hexane diol, or castor oil. In this context by the term "long chain" we mean compounds having more than 3 carbon atoms between the functional groups (i.e. hydroxyl or carboxyl).

Alternatively the plasticizer may be a known plasticizing compound such as an alkyl phosphate, a halogenated alkyl phosphate, a halogenated paraffin, and ester type plasticizers such as di-octyl phthalate and di-octyl maleate. The preferred plasticizers contain either phosphorus or halogen or both, these compounds being fire-retardant plasticizers which we have now found to improve the efficiency of the intumescent system. The particularly preferred plasticizers are tris 2,3-dibromo propyl phosphate, tris monochloro ethyl phosphate and tri-ethyl phosphate. Intumescent compositions based on plasticized unsaturated polyesters are the subject of our co-pending UK Patent Application No. 19695/77.

Alternatively the composition may be in the form of a paint system wherein the total composition includes not only the resin solution and intumescent additives but also further solvent such as xylol and/or n-butanol, driers, e.g. cobalt metal, lead, and other additives e.g. pigments. The resin may be, for example, an air-drying alkyd resin, or an alkyd/amino stoving composition.

The resin in either system preferably contains 10 to 40 percent by weight of combined halogen e.g. chlorine, or bromine since such resins have enhanced fire resistance and thus improve the fire resistant qualities of coatings made therefrom, and they enhance the intumescent properties of the system.

Whilst the primary use of the compositions of this invention is in coatings, other uses are possible. One such use is in strips around the edges of fire doors, either in a recess on the door or on the door jamb. The function of the strip in this case is to intumesce under fire conditions to act as a fire resistant seal around the door to slow down the rate at which fire can penetrate via the door edges.

The invention will now be described in greater detail, by way of example only, by means of the following Examples.

EXAMPLES

(i) Preparation of Polyester Resins

Resin A 1,303 grams of ethylene glycol, 4,082 grams of hexachloroendomethylenetetrahydrophthalic acid * and 822 grams of maleic anhydride were condensed at temperatures up to 170° C. until a product with an acid value of 30–35mgrams KOH/grm was obtained. 0.26 grams of hydroquinone were added and the product was then dissolved in styrene monomer to form a resin solution containing 60% by weight of polyester. The material had a chlorine content of 23.9% based on the weight of resin solution.

* Hexachloroendomethylenetetrahydriphthalic acid is commercially available from Hooker Chemicals under the trade name HET acid.

Resin B (plasticizing resin)

453.5 grams of diethylene glycol, 163.3 grams of propylene glycol, 356 grams of isophthalic acid, 205.5 grams of maleic anhydride, 288 grams of adipic acid and 58 grams of dimeric acid (Empol 3,020 ex Unilever Emery) were condensed at temperatures up to 200° C. until a product with an acid value of 25–35mgrams KOH/gram was obtained. 0.092 grams of hydroquinone were added and the product was then dissolved in styrene monomer to form a resin solution containing 70% by weight of polyester.

Resin C 3,010 Grams of diethylene glycol, 193 grams of ethylene glycol, 498 grams of propylene glycol, 210 grams of nonanol, 2,590 grams of isophthalic acid and 2,038 grams of maleic anhydride were condensed at temperatures up to 220° C. until a product with acid value less than 20mgrams KOH/gram was obtained. 0.9 grams of hydroquinone were added and the product was then dissolved in styrene monomer to form a resin solution containing 67% by weight of polyester.

Resin D

381 Grams of dibromoneopentyl glycol, 97 grams of maleic anhydride and 128 gramsp of HET acid were condensed at temperatures up to 170° C. until the product with an acid value of 30–35mgrams KOH/gram was obtained. 0.07 grams of hydroquinone were added and the product was then dissolved in a mixture of 324 grams of styrene monomer and 34 grams of methyl methacrylate. The material had a bromine content of 24.7% and a chlorine content of 7.4% based on the weight of resin solution.

Resin E 180.2 Grams of glycerol (purity 99%), 669.8 grams of HET acid, 6.7 grams of maleic anhydride and 645 grams of sunflower seed fatty acids were condensed at temperatures up to 170° C. until a product with an acid value of 7.45mgrams KOH/gram was obtained. The product was blended with xylol to give a resin solution containing 83% by weight of alkyd. The material had a chlorine content of 26% based on the weight of solid alkyd resin.

(ii) Preparation of Intumescent Polyester Resin gel-coats based on Resins A, B, C and D 140 Gram lots of each formulation described in Tables 1 and 2 below were roughly mixed and were then finely dispersed by grinding on a triple roll mill. 50 gram aliquots were then taken and treated with 0.3 mls of cobalt-accelerator 5502/8 (ex Novadel Ltd.) and 0.3 mls of a peroxide, Trigonox 44B (ex Novadel Ltd.) The catalysed composition was then applied to a sheet of cellophane stretched tightly over a 1ft. square piece of plate glass, and was spread out into a uniform film 15 thou thick using a doctor blade. The gel-coat was allowed to cure and was then reinforced by means of a polyester resin-glass laminate composed of 2 layers of 1½ oz. chopped strand mat impregnated with a pre-accelerated general purpose laminating polyester resin (BEETLE 864 ex B.I.P. Chemicals) containing, as catalyst 1.5%, based on the weight of polyester resin, of methyl ethyl ketone peroxide (SD2 grade ex Laportes). The resin:glass ratio of the back-up laminate was 2:1. The laminate was allowed to cure and the whole composite was then removed from the cellophane and was post-stoved 3 hrs. at 80° C.

The formulations were tested for storage life, and the gel-coats were tested for intumescent properties, burning resistance and capability to withstand humidity, the results of these tests also being detailed in tables 1 and 2.

Details of the test procedures employed are given after Table 3 in the specification.

TABLE 1

| Gel Coat Formulation | 1 | 2 | 3 | 4 | 5 | 6 | 7 |
|---|---|---|---|---|---|---|---|
| Resin A | 5.7pts | 5.7pts | 5.7pts | 6.8pts | 5.7pts. | | |
| Resin B | 2.3pts | 2.3pts | 2.3pts | 1.2pts | 2.3pts | | |
| Resin C | | | | | | 8.0pts. | |
| Resin D | | | | | | | 8.0pts |
| Phos Chek P/30 | 4.8pts | 4.0pts | 4.0pts | 4.0pts | 4.0pts | 4.0pts | 4.0pts |
| Dipentaerythritol | 1.2pts | 1.0pts | 1.0pts | 1.0pts | 1.0pts | 1.0pts | 1.0pts |
| Melamine | | 1.0pts | | | | | |
| Melamine mono-oxalate | | | 1.0pts | 1.0pts | | 1.0pts | 1.0pts |
| Melamine mono-succinate | | | | | 1.0pts | | |
| Storage Life (days) | >28 | Thickened after 1 day | >28 | >28 | >28 | >28 | >28 |
| Intumescent Properties | | | | | | | |
| Foam stability | s | s | s | s | s | s | s |
| Foam height mm | 7.0 | 7.0 | 7.0 | 8.0 | 7.0 | 5.0 | 8.0 |
| Burning Test | | | | | | | |
| Time to ignite vapours | 30secs | 30secs | 30secs | 240secs | 30secs | 30secs | >600 |
| Time to ignite surface | 30secs | 60secs | 120secs | 240secs | 45secs | 45secs | >600 |

TABLE 1-continued

| Gel Coat Formulation | 1 | 2 | 3 | 4 | 5 | 6 | 7 |
|---|---|---|---|---|---|---|---|
| Resistance to humidity | | | | | | | |
| Foam Height After 7 days | 4mm | 6.5mm | 6mm | 7.5mm | 5mm | 4.5mm | 8mm |
| Foam Height after 28 days (mm) | 0 | 6.5 | 2.5 | 6.0 | 0 | 3.5 | 7 |

NB
The laminate without gel coat when subjected to the burning test catches fire and continues to burn after exposure to the bunsen flame for only 8 secs.

TABLE 2

| Gel coat formulation | 8 | 9 | 10 | 11 | 12 | 13 |
|---|---|---|---|---|---|---|
| Resin A | 6.8pts | 6.8pts | 6.8pts | 6.8pts | 6.8pts | 6.8pts |
| Resin B | 1.2pts | 1.2pts | 1.2pts | 1.2pts | 1.2pts | 1.2pts |
| Phos Chek P/30 | 4.0pts | 5.0pts | 3.0pts | 4.0pts | 4.0pts | 4.0pts |
| Dipentaerythritol | 1.0pts | 0.5pts | 1.5pts | 0.5pts | | 1.5pts |
| Melamine mono-oxalate | 1.0pts | 0.5pts | 1.5pts | 1.5pts | 2.0pts | 0.5pts |
| Intumescent Properties | | | | | | |
| Foam Stability | S | SI | S | S | US | S |
| Foam height mm | 8.0 | 6.0 | 8.0 | 7.0 | — | 7.0 |
| Burning Test | | | | | | |
| Time to ignite vapours | 240secs | 30secs | 240secs | 45secs | | 195secs |
| Time to ignite surface | 240secs | 60secs | 240secs | 90secs | | 195secs |
| Resistance to humidity | | | | | | |
| Foam height after 7 days | 7.5 | 6.0 | 7.0 | 6.0 | — | 6.5 |
| Foam height after 28 days | 6.0 | 3.0 | 6.5 | 4.5 | — | 5.0 |

Legend:-
S = Stable
SI = slight instability
US = unstable

In Examples 1 to 5 and 8 to 13 Resin B is used to plasticize Resin A which would otherwise be somewhat brittle for this purpose.

(iii) Preparation of Intumescent paints based on Resin E

Three paints are described in Table 3. Formulations 14 and 15 were air-drying finishes, while 16 was a low-bake system. In formulations 15 and 16 the ingredients were roughly mixed and were then finely dispersed by grinding on a triple roll mill. These formulations together with No. 14 were then reduced to a brushable consistency by dilution with a blend of 3 pts. by volume of xylol and 1 pt. by volume of n-butanol.

The three finishes were applied by brushing to samples of a cured glass reinforced polyester laminate having a resin:glass ratio of 2:1 prepared from 2 layers of 1½ oz. chopped strand mat impregnated with polyester resin BEETLE 864. Coatings prepared from formulations 14 and 15 were allowed to air-dry for 2 days at room temperature before second coats were applied. The laminate coated with formulation 16 was allowed to air-dry for 15 mins. before being stoved for 30 mins. at 95° C. After allowing to age overnight the specimen was recoated and stoved as before. All the specimens were then allowed to age for 1 week before testing by the procedures described earlier. The results are included in Table 3. They clearly show that the laminate has improved fire resistance when coated with an intumescent paint.

TABLE 3

| Formulation | 14 (2) | 15 (2) | 16 |
|---|---|---|---|
| Resin E (83.1% solids content) | 192.6pts | 192.6pts | 115.5pts |
| BEETLE 687 [1] (55% solids content) | | | 116.0pts |
| Phos Check P/30 | | 80.0pts | 80.0pts |
| Dipentaerythritol | | 20.0pts | 20.0pts |
| Melamine mono-oxalate | | 20.0pts | 20.0pts |
| Storage life | >28days | >28days | >28days |
| Intumescent Properties (Glo-bar test) | | | |
| Foam stability | — | S | S |
| Foam height mm | Nil | 5 | 6 |
| Burning Test | | | |
| Time to ignite vapours | 15secs | 30secs | 30secs |
| Time to ignite surface | 15secs | 45secs | 45secs |

(1) BE687 is an isobutylated melamine - formaldehyde condensate (ex B.I.P. Chemicals) supplied as a 55% solids solution in isobutanol.
(2) Contained as driers based on the weight of solid resin binder 0.025% cobalt metal and 0.25% of lead.

The test procedures utilized to obtain the test results tabulated in Tables 1, 2 and 3 above were as follows:

Intumescent Properties

A 25 cm long 1 kilowatt radiant electric fire bar mounted in a horizontal plane was switched on and allowed to reach a steady condition. A sample of the gel-coated laminate with the gel-coat surface uppermost was placed on an asbestos composition block positioned beneath the bar such that the gel-coat surface was 1 cm from the lowest point of the bar. The specimen was irradiated for 2 mins. and was then withdrawn. An examination of the gel-coat surface was made to determine the extent to which intumescence had occurred. Foams which were liquid and collapsed on cooling were considered to be unsatisfactory and were categorised as unstable. In cases where rigid foams were obtained the maximum foam height was measured. This gives an indication of the inherent insulative properties of the system.

Burning Tests

A 7½" × 7½" square portion of gel-coated laminate was supported by a metal tripod in such a way that the laminate lay in a horizontal plane with the gel-coat surface uppermost. A bunsen burner (Type 502/2 manufactured by Amal Ltd., Holdford Road, Birmingham B6 7ES) operating on natural gas was lit and the gas and air supplies adjusted until the flame height was 6" and the height of the inner blue cone was 2". The burner was then held above the laminate with the flame playing across a portion of the gel-coated surface. The angle of depression of the burner was approximately 45°, and the distance of the burner from the laminate was such that the very tip of the inner blue cone just impinged on the surface of the gel-coat.

At 15 second intervals the flame was removed and an attempt was then made to temporarily ignite any flammable gases percolating through the carbonaceous foamed mat. The total heating time required to achieve ignition of volatile vapours was recorded.

In a separate test, set up in the same manner, the bunsen flame was again removed at 15 second intervals. The time taken for the surface of the laminate to continue to burn after removal of the bunsen flame was recorded. These measurements give an indication of the fire resistance properties of the system.

Resistance to Humidity

Two portions of the gel-coated laminate were placed in a humidity chamber operating under conditions described in BS3900 Part F2 April 1973. (Determination of resistance to humidity under condensation conditions). One sample was exposed for 7 days, the other for 28 days. Upon withdrawing the specimens from the test chamber they were dried with paper tissues and were then allowed to stabilize for 24 hrs. They were then tested for intumescent properties by means of the glo-bar test. Foam height obtained after exposure in the humidity chamber indicates the extent to which intumescent additives are resistant to leaching from the gel-coat matrix.

NB

Laminates with a minimum vapour ignition time of 30 secs and a minimum surface ignition time of 45 secs were considered to offer a worthwhile improvement in fire resistance properties.

EXAMPLES 17 to 23

Gel coats were made up by the same procedure as in Examples 1 to 13 to the formulations shown in Table 4 below.

TABLE 4

| Example No. | 17 | 18 | 19 | 20 | 21 | 22 | 23 |
|---|---|---|---|---|---|---|---|
| Formulation | | | | | | | |
| Resin A (PGW) | 6.8 | 6.8 | 6.8 | 6.8 | 6.8 | 6.8 | 6.8 |
| Resin B | 1.2 | 1.2 | 1.2 | 1.2 | 1.2 | 1.2 | 1.2 |
| Phos Chek P30 | 3.0 | 3.0 | 3.0 | 3.0 | 3.0 | 3.0 | 3.0 |
| Dipentaerythritol | 1.5 | 1.5 | 1.5 | 1.5 | 1.5 | 1.5 | 1.5 |
| Dimelamine itaconate | | 1.5 | | | | | |
| Dibenzoguanamine oxalate | | | 1.5 | | | | |
| Melamine Maleate | | | | 1.5 | | | |
| Acetoguanamine oxalate | | | | | 1.5 | | |
| Melamine oxalate | | | | | | 1.5 | |
| Propioguanamine oxalate | | | | | | | 1.5 |
| Glow-Bar Test | | | | | | | |
| Foam Height (mm) | 2 | 6 | 2 | 4 | 4 | 9 | 8 |
| Foam stability | S | S | S | S | S | S | S |
| Bunsen Test | | | | | | | |
| Surface Ignition (seconds) | 30 | 60 | 30 | 68 | 83 | 143 | >180 |
| Vapour Ignition (seconds) | 30 | 38 | 30 | 45 | 45 | 68 | 38 |
| High Humidity Cabinet Test | | | | | | | |
| Initial Foam Height (mm) | — | 6 | 2 | 4 | 4 | 9 | 8 |
| Redetermined Foam Height | | | | | | | |
| 1W (mm) | — | 4 (0) | 2 (0) | 4 (0) | 4 (0) | 7 (0) | — |
| 1M | — | 3 (1) | 1 (1) | 3 (1) | 3 (1) | 4 (2) | — |
| Coating Stability | | | | | | | |
| 1D | — | S | S | S | S | S | S |
| 1W | — | T | S | S | S | S | — |
| 1M | — | T | S | S | S | S | — |

Samples were tested as in Examples 1 to 13 the results of these tests also being shown in the table.

Example 17 is a comparitive example in which the blowing agent has been omitted from the intumescent composition. The other examples test various salts, melamine oxalate also being included for comparision.

It is apparent from these tests that dibenzoguanamine oxalate had no beneficial effect on the properties of the composition, the other salts all showing beneficial effects, melamine mono-oxalate being the most effective.

EXAMPLES 24 to 30

A series of gel coats were made up by the same procedure as in Examples 1 to 13 using the formulation of Example 10 except that the melamine salts of various carboxylic acids were substituted for melamine oxalate, the melamine oxalate also being used again for comparison purposes under the same conditions. The salts were mono- (1 to 1) salts except where stated.

The intumescent properties of the compositions were tested, the results being tabulated in Table 5.

TABLE 5

| EX. NO. | DIBASIC ACID | INTUMESCENT CHARACTERISTICS | | | CARBON | |
|---|---|---|---|---|---|---|
| | | FOAM HEIGHT | VAPOUR IGNITION (secs) | SURFACE IGNITION (secs) | No. of Non-CARBOXYLIC C. atoms | %C |
| 24 | Oxalic | 9mm | 68s | 143s | 0 | 0 |
| 25 | Oxalic (Dimelamine Salt) | 8/9 | 45 | 120 | 0 | 0 |
| 26 | SUccinic | 5 | 30 | 90 | 2 | 20.3 |

TABLE 5-continued

| EX. NO. | DIBASIC ACID | INTUMESCENT CHARACTERISTICS | | | CARBON | |
|---|---|---|---|---|---|---|
| | | FOAM HEIGHT | VAPOUR IGNITION (secs) | SURFACE IGNITION (secs) | No. of Non-CARBOXYLIC C. atoms | %C |
| 27 | Malonic | 5 | 30 | 75 | 1 | 11.5 |
| 28 | Maleic | 4 | 45 | 68 | 2 | 20.7 |
| 29 | Itaconic (Dimelamine) Salt | 6 | 38 | 60 | 3 | 27.7 |
| 30 | Adipic | 4 | 30 | 60 | 4 | 32.9 |

We claim:

1. An intumescent composition comprising a resinous binder and an inorganic acid source, a carbon source and as blowing agent a salt of
   (a) a 2-amino s-triazine of general formula $$\begin{array}{c} R^1 \quad N \quad NH_2 \\ \diagdown C \diagup \diagdown C \diagup \\ \| \quad \quad \| \\ N \quad \quad N \\ \diagdown C \diagup \\ | \\ R^2 \end{array}$$

in which $R^1$ and $R^2$ are the same or different and are each selected from the group consisting of hydrogen, halogen, hydroxyl and amino groups and alkyl, substituted alkyl, alkenyl and substituted alkenyl groups containing up to 6 carbon atoms and
   (b) a saturated or unsaturated polybasic carboxylic acid containing no more than 2 non-carboxyl carbon atoms per carboxyl group.

2. A composition according to claim 1 in which at least one of $R^1$ and $R^2$ is an amino group.

3. A composition according to claim 2 in which the triazine is melamine.

4. A composition according to claim 2 in which the triazine is propioguanamine.

5. A composition according to claim 1 in which the polybasic carboxylic acid is a dibasic carboxylic acid.

6. A composition according to claim 5 in which the dibasic carboxylic acid is oxalic acid.

7. A composition according to claim 1 in which the salt is melamine mono-oxalate.

8. A composition according to claim 1 in which the salt is dimelamine oxalate.

9. A composition according to claim 1 in which the inorganic acid source is ammonium polyphosphate.

10. A composition according to claim 1 in which the carbon source material is selected from the group consisting of starches, polyhydric alcohols and sugars.

11. A composition according to claim 10 in which the carbon source material is dipentaerythritol.

12. A composition according to claim 1 in which the ratio of resin binder to total intumescent additives is in the range by weight of 75:25 to 40:60.

13. A composition according to claim 12 in which the ratio of total inorganic acid source to carbon source plus blowing agent is in the range 85:15 and 30:70 and the ratio of carbon source to blowing agent is in the range 90:10 to 10:90.

14. A composition according to claim 1 in which the resin binder is a solution of an unsaturated polyester resin in an unsaturated monomer.

15. A composition according to claim 14 in which the unsaturated polyester is plasticized by means of a plasticizing unsaturated polyester resin.

16. A composition according to claim 15 in which said plasticizing resin contains units derived from long chain dibasic aliphatic acids or long chain polyols.

17. A composition according to claim 1 which is a paint system in which the resin binder is a solution containing further additives.

18. A composition according to claim 17 in which the resin binder is an air-drying alkyd resin.

19. A composition according to claim 17 in which the resin binder is an alkyd/amino stoving composition.

20. A composition according to claim 1 in which the resin contains 10 to 40 percent by weight of chemically combined halogen.

* * * * *